T. DOUGHERTY.
AUTOMOBILE FENDER.
APPLICATION FILED FEB. 21, 1918.

1,266,430.

Patented May 14, 1918.
2 SHEETS—SHEET 1.

WITNESSES

INVENTOR
T. Dougherty
BY
ATTORNEYS

T. DOUGHERTY.
AUTOMOBILE FENDER.
APPLICATION FILED FEB. 21, 1918.
1,266,430.
Patented May 14, 1918.
2 SHEETS—SHEET 2.
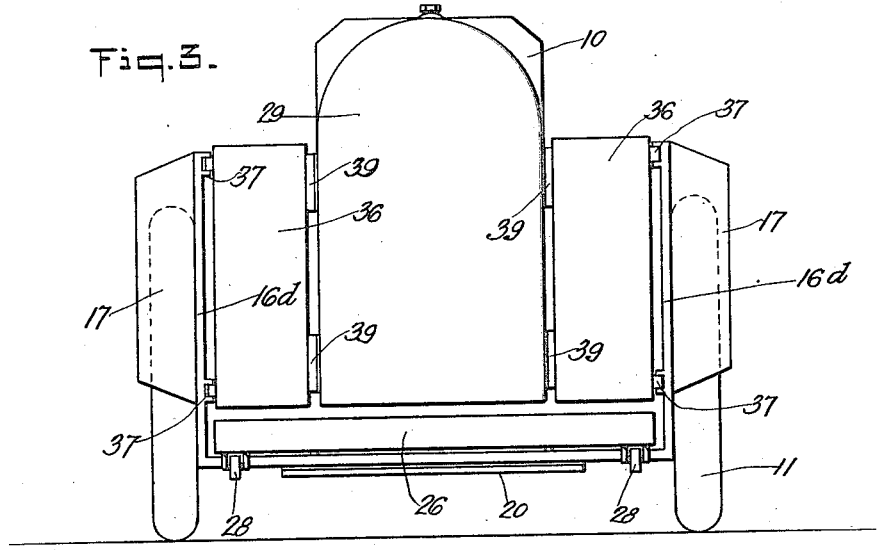
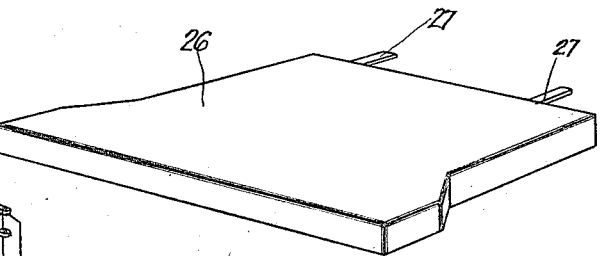
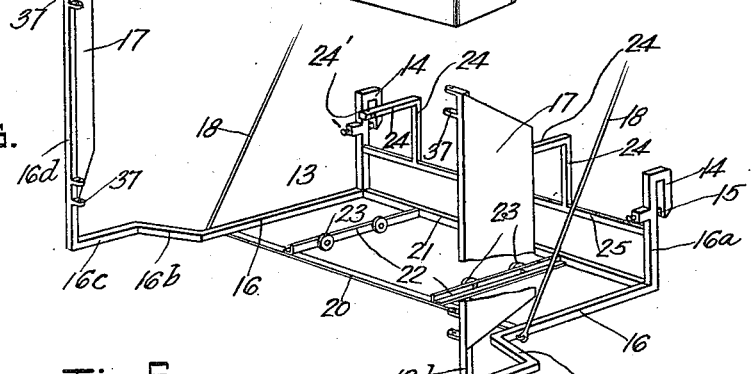
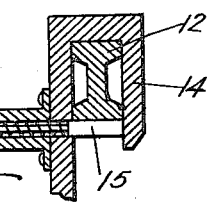
WITNESSES
INVENTOR
T. Dougherty
BY
ATTORNEYS

UNITED STATES PATENT OFFICE.

TERENCE DOUGHERTY, OF BROOKLYN, NEW YORK.

AUTOMOBILE-FENDER.

1,266,430. Specification of Letters Patent. Patented May 14, 1918.

Application filed February 21, 1918. Serial No. 218,573.

*To all whom it may concern:*

Be it known that I, TERENCE DOUGHERTY, a citizen of the United States, and a resident of the city of New York, borough of Brooklyn, in the county of Kings and State of New York, have invented a new and Improved Automobile-Fender, of which the following is a full, clear, and exact description.

This invention relates to safety appliances for vehicles and has particular reference to fenders for automobiles or the like.

Among the objects of the invention is to provide an attachment for or to be carried upon the front end of an automobile for the purpose of preventing injury to pedestrians who might otherwise be struck and injured by the machine.

In carrying out this improvement by way of practical instrumentalities I provide an upright pad and also a relatively horizontal pad or mat so related to each other that when the vertical pad is forced rearward relatively by impact with an object the horizontal pad will be projected forward so as to drop into inclined position upon the roadway.

The preferred means for carrying out the objects of this invention will be better understood as this description progresses and has reference to the accompanying drawings of which—

Fig. 3 is a front elevation showing the parts in normal running position.

Fig. 4 is a perspective view of the horizontal mat.

Fig. 5 is a perspective view of the frame work which supports the movable parts of the fender; and Fig. 6 is a transverse sectional detail of the attachment clip whereby my improvement is detachably connected to the front axle or its equivalent.

Figure 1:
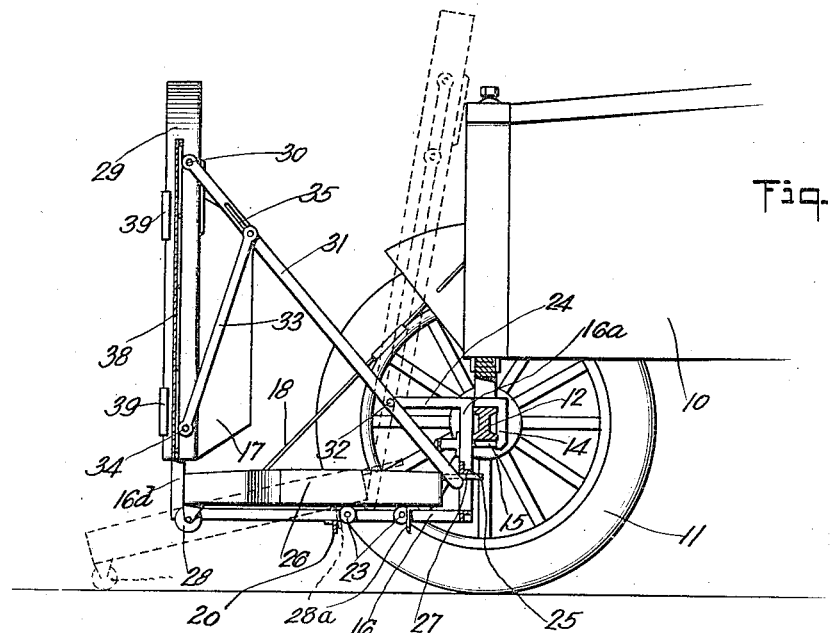
Figure 1 is a side elevation, partly in section, on the line 1—1 of Fig. 2.

Referring now more particularly to the drawings, I show at 10 the front end of an automobile having wheels 11 and front axle 12 to which the frame indicated as a whole at 13 is detachably connected.

Said frame comprises a pair of hooks 14 adapted to embrace or engage over the axle 12 and be detachably locked thereto by any suitable means, as for instance spring pressed keepers 15. Said frame may be formed of any suitable strong and rigid material and comprises a pair of bars 16 which may constitute integral extensions of said hooks 14. Adjacent to the hooks 14 the bars drop down toward the ground at $16^a$ where they merge into horizontal portions and thence they are bent outward in the same horizontal plane but in opposite directions at $16^b$ and thence forward at $16^c$ and finally upward at $16^d$ forming posts to each of which is secured a rigid wing 17 which constitutes a fender to engage a person or other object and deflect the same laterally so as not to be struck by means of a wheel just in the rear thereof. By reason of the laterally directed portions $16^b$ the anchorage portion of the frame lies entirely between the wheels whereas the front portion of the frame has a wider scope. The frame is supported in front by means of guy rods 18, or their equivalent, which extend upward to points of connection 19 with any suitable part of the machine. 20 and 21 indicate a pair of transverse braces extending between the bars 16 and upon which are secured a pair of parallel forwardly directed intermediate braces 22 carrying antifriction rollers 23. I also provide at 24 a pair of upwardly and forwardly projecting arms shown as supported upon a crossbar 25 extending between the rear vertical portions $16^a$ of the bar 16, said arms being provided with transverse holes 24'.

The aforesaid horizontal mat 26 shown in detail in Fig. 4 may be formed of any suitable resilient or upholstered structure and of a form in plan corresponding substantially to the horizontal space between the bars 16 and their lateral extensions. 27 indicates a pair of rearward extensions that normally contact under the cross bar 25. The bottom of this mat rests upon the aforesaid antifriction rollers 23 and so the front portion of the mat is held suspended free from the ground. When, however, the mat is projected relatively forward releasing the projections 27 from the bar 25 said front end drops, as indicated in dotted lines in Fig. 1, bringing the rollers 28 upon the ground, and stop members $28^a$ against the bar 20.

The other main resilient fender portion comprises a substantially vertical mat 29 which hangs normally suspended from the pivots 30 at the upper forward ends of a pair of rigid bars 31 pivoted at 32 through the holes 24' at the front ends of the arms 24. These bars are in the nature of levers of the first class and while the longer forward ends thereof directly support the mat 29 the shorter rear ends thereof project beneath the crossbar 25 and so the front ends of the arms are held from swinging downward beyond the normal position shown in full lines in Fig. 1. When, however, a person or other obstacle is struck by the mat 29 the mat is swung rearward relatively toward or into the position shown in dotted lines in Fig. 1, the swinging movement being around the axis of the pivots 32. It will be noted that during this swinging movement of the bars 31 the rear ends thereof acting against the rear edge of the mat 26 project the same forward disconnecting the extension engagement thereof with the bar 25 and dropping the front end thereof as already set forth. This forward movement of the mat 26 is facilitated by anti-friction rollers 23. 33 indicates a pair of stays pivoted at their lower ends at 34 to the bottom of the mat 29 and having loose pivotal engagement through slots 35 at their upper ends in the bars 31. Thus the mat 29 will be held from vibration or oscillation in normal running position, but will not be resisted from rearward swinging movement when impinged against.

Figure 2:
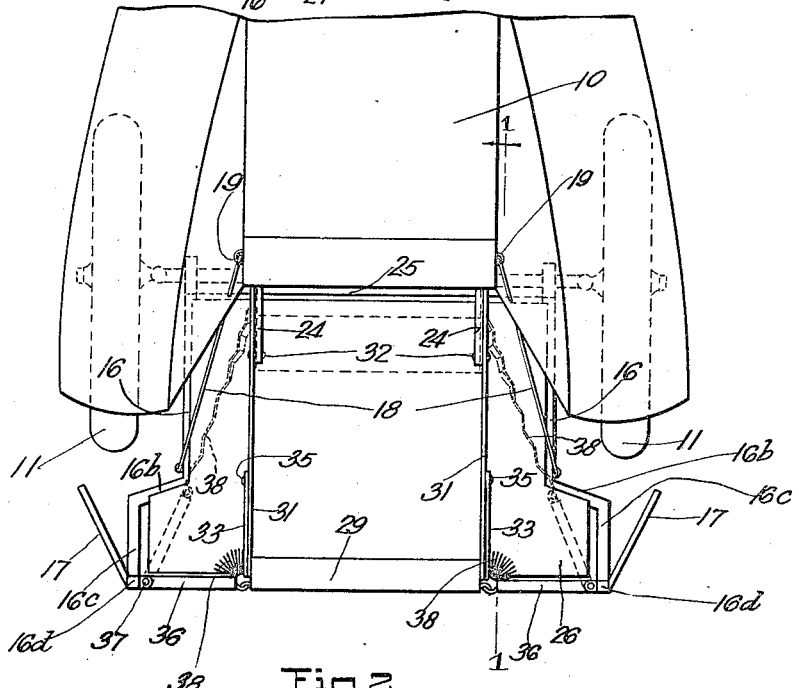
Fig. 2 is a plan view of the same.

The mat 29, see Fig. 3, is materially narrower than the space between the upright portions 16$^d$ of the side bars and the wings 17 carried thereby. I, therefore, provide a pair of pivoted wings or panels 36 hinged at their outer edges at 37 to said upright portions 16$^d$ providing for the rearward swinging of the wings 36 around vertical axes as shown in dotted lines in Fig. 2. The inner edges of the wings 36 have two means of attachment to the adjacent lateral vertical edges of the mat 29. One of these means is an accordion like flexible connection 38 normally folded as shown in Fig. 2 but extensible as shown in dotted lines when the vertical mat 29 is forced rearward. The other means of connection between the mat 29 and the wings 36 consists of rigid fingers 39 carried by the respective parts, the arrangement being such as indicated in Fig. 2 that these wings and mat will be carried rearward at about the same time when either of the parts is struck, thus insuring that the mat will be carried rearward and the floor mat will be projected forward in due time.

The accordion plaited curtains 38, however, substantially inclose the sides of the device when the vertical mat is thrown backward and so the person or obstacle will be delivered reliably upon the horizontal mat.

I claim:

1. The herein described fender for automobiles comprising in combination an upright mat, a relatively horizontal mat, means to support the latter mat free from the ground in normal position, means acting between the two mats serving to project the horizontal mat relatively forward and downward into contact with the ground when the upright mat is struck, and lugs carried by the horizontal mat to limit the forward movement of the horizontal mat.

2. In a fender of the class set forth, the combination of a relatively horizontal mat, means to support it normally so that the front end thereof is free from the ground, an upright contact member, and means supporting said contact member, said supporting means for the contact member comprising a pair of bars mounted on fixed pivots between their ends and serving to project the horizontal mat forward and downward to engage the ground as result of impact against the contact.

3. In a fender of the class set forth, the combination of a frame, means to detachably secure the rear portion of the frame to a vehicle axle, said frame including horizontal and upwardly projecting members, a horizontal mat supported upon the horizontal portion of the frame, a pair of bars pivoted upon the forwardly projecting members above the mat, and an upright mat connected to the upper ends of said bars while the lower ends of said bars engage at the rear of the horizontal mat and whereby when the upright mat is engaged by an obstacle and swung relatively rearward the horizontal mat will be projected forward and downward.

4. In a fender of the character set forth, the combination of a supporting frame, an upright mat, a pair of bars pivoted to the frame and to the upper portion of the mat, and a pair of stays pivoted to the lower corners of the mat and slidably connected to the upper portions of the bars to normally prevent oscillation of the mat.

TERENCE DOUGHERTY.

Copies of this patent may be obtained for five cents each, by addressing the "Commissioner of Patents, Washington, D. C."